United States Patent
Levin

(10) Patent No.: US 11,339,808 B2
(45) Date of Patent: May 24, 2022

(54) METHOD FOR CONTROLLING A HYDRAULIC SYSTEM OF A VEHICLE DRIVELINE

(71) Applicant: VOLVO TRUCK CORPORATION, Gothenburg (SE)

(72) Inventor: Robin Levin, Kungsbacka (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 17/268,181

(22) PCT Filed: Aug. 21, 2018

(86) PCT No.: PCT/EP2018/072520
§ 371 (c)(1),
(2) Date: Feb. 12, 2021

(87) PCT Pub. No.: WO2020/038564
PCT Pub. Date: Feb. 27, 2020

(65) Prior Publication Data
US 2021/0301841 A1    Sep. 30, 2021

(51) Int. Cl.
*F16H 61/16*    (2006.01)
*F16H 61/18*    (2006.01)
(Continued)

(52) U.S. Cl.
CPC ............. *F15B 15/20* (2013.01); *B60K 17/02* (2013.01); *B60K 17/10* (2013.01); *B60W 10/02* (2013.01);
(Continued)

(58) Field of Classification Search
CPC .......... F16H 61/16; F16H 61/18; F16H 61/02; F16H 61/00; F16H 61/00217;
(Continued)

(56) References Cited

U.S. PATENT DOCUMENTS 4,075,912 A * 2/1978 Schaefer ............. F16H 61/0267
  137/386
5,157,608 A 10/1992 Sankpal et al.
(Continued)

FOREIGN PATENT DOCUMENTS

CN    102695885 A    9/2012
CN    103775627 A    5/2014
(Continued)

OTHER PUBLICATIONS

International Search Report and Written Opinion dated Apr. 30, 2019 in corresponding International PCT Application No. PCT/EP2018/072520, 9 pages.
(Continued)

*Primary Examiner* — Tisha D Lewis
(74) *Attorney, Agent, or Firm* — Venable LLP; Jeffri A. Kaminski

(57) ABSTRACT

The invention relates to a method for controlling a hydraulic system of a vehicle driveline. According to the method a transmission (13) of a driveline (2) is controlled in a limited actuation mode, if the pressure (p) is below the predetermined critical lower threshold value (Tcl), wherein in the limited actuation mode the transmission (13) is controlled such that less actuator actuations is performed in comparison to a normal actuation mode.

15 Claims, 5 Drawing Sheets

(51) Int. Cl.
  *F16H 61/00* (2006.01)
  *F16H 61/02* (2006.01)
  *B60W 10/103* (2012.01)
  *F15B 15/20* (2006.01)
  *B60K 17/02* (2006.01)
  *B60K 17/10* (2006.01)
  *B60W 10/02* (2006.01)
  *B60W 10/06* (2006.01)
  *B60W 30/18* (2012.01)
  *G01C 21/34* (2006.01)

(52) U.S. Cl.
  CPC .......... *B60W 10/06* (2013.01); *B60W 10/103* (2013.01); *B60W 30/18009* (2013.01); *G01C 21/3407* (2013.01); *B60W 2510/06* (2013.01)

(58) Field of Classification Search
  CPC ..... F16H 61/0034; F15B 15/20; B60K 17/02; B60K 17/10; B60W 10/02; B60W 10/06; B60W 10/103; B60W 30/18009; B60W 2510/06; G01C 21/3407
  See application file for complete search history.

(56) References Cited

U.S. PATENT DOCUMENTS

| | | | | |
|---|---|---|---|---|
| 5,197,787 | A | * | 3/1993 | Matsuda ............... B60T 8/4045 188/181 R |
| 7,222,005 | B2 | * | 5/2007 | Kang ..................... F16H 61/12 474/18 |
| 2006/0000207 | A1 | | 1/2006 | Rush |
| 2008/0133097 | A1 | | 6/2008 | Schneider et al. |
| 2017/0204967 | A1 | | 7/2017 | Leone et al. |

FOREIGN PATENT DOCUMENTS

| | | | | |
|---|---|---|---|---|
| DE | 102009042178 | A1 | | 3/2011 |
| EP | 0479349 | A1 | | 4/1992 |
| EP | 1178245 | A1 | * | 2/2002 ............. F16H 61/12 |
| FR | 3014990 | A1 | | 6/2015 |
| WO | 03031244 | A1 | | 4/2003 |

OTHER PUBLICATIONS

China Office Action dated Sep. 15, 2021 in corresponding China Patent Application No. 201880096500.6, 11 pages.

* cited by examiner

METHOD FOR CONTROLLING A HYDRAULIC SYSTEM OF A VEHICLE DRIVELINE

CROSS-REFERENCE TO RELATED APPLICATIONS

This application is a U.S. National Stage application of PCT/EP2018/072520, filed Aug. 21, 2018, and published on Feb. 27, 2020, as WO 2020/038564 A1, all of which is hereby incorporated by reference in its entirety.

TECHNICAL FIELD

The invention relates to a method for controlling a hydraulic system of a vehicle driveline.

The invention can be applied in motor vehicles, and especially heavy-duty vehicles, such as trucks, buses and construction equipment. Although the invention will be described with respect to a truck, the invention is not restricted to this particular vehicle, but may also be used in other vehicles as mentioned above.

BACKGROUND

Hydraulic systems that control with pressurised media are commonly used in motor vehicles today. Actuators controlled by pressurised fluids are for example clutch actuators, gear change actuators and brake actuators. A pressurised fluid is needed in the hydraulic system, which also needs to maintain a sufficiently high pressure in order to actuate the actuators when needed. A mechanically or electrically driven hydraulic pump supplies the fluid at an operating pressure level sufficient for actuating the actuators.

A known method for minimizing the negative influence on fuel consumption of vehicles equipped with hydraulic systems is to provide a pressure accumulator that can keep the pressure in the hydraulic system at a sufficient level to actuate the actuators when the pump is deactivated. Deactivation of the pump, when not needed gives a positive effect of the energy consumption of the vehicle. An example of such a system is disclosed in US 2008/0133097, in which the energy expenditure for operating the hydraulic pump is provided in a fuel-saving manner when the vehicle is in a trailing throttle operation or a braking operation. During these operating phases, the kinetic energy of the vehicle is reduced, this being achieved primarily through frictional losses in the driveline and/or the vehicle service brakes. When the hydraulic pump is activated during these operating phases, the pump converts this kinetic energy into a pressure-increase of the media in the hydraulic system.

A problem associated with such known systems is that a pressure loss below a sufficient pressure level for operating the actuators can occur suddenly if many actuators are actuated simultaneously, the risk for such a pressure drop is especially critical when the pump is deactivated.

SUMMARY

An object of the invention is to provide an energy efficient method for controlling a hydraulic system of a vehicle driveline that ensures a sufficient fluid pressure in the hydraulic system for controlling the hydraulic actuators of the driveline.

In one aspect of the invention the object is achieved by a method according to claim 1. The method relates to a hydraulic system of a vehicle driveline, wherein the hydraulic system at least comprises a pump, a pressure accumulator, and a hydraulic actuator arranged in fluid connection with each other, for controlling actuators of the driveline. The pump supplies hydraulic fluid into the hydraulic system in order to increase and maintain a hydraulic pressure of the hydraulic system. This method comprises the steps of;
  determining a fluid pressure in the hydraulic system,
  comparing the determined fluid pressure with an upper threshold value and,
if the determined fluid pressure is above the upper threshold value;
  decreasing the supply of hydraulic fluid into the hydraulic system,
  comparing the fluid pressure of the hydraulic system with a critical lower threshold value and,
  if the pressure of the hydraulic system is below the predetermined critical lower threshold value,
    controlling a transmission of the driveline in a limited actuation mode, and wherein in the limited actuation mode the transmission is controlled such that less actuations of the actuator is performed in comparison to a normal actuation mode.

In order to re-establish a sufficient fluid pressure in the hydraulic system, it is provided that the supply of hydraulic fluid into the hydraulic system is increased again. This is done either when the fluid pressure has reached the critical lower threshold value or at a higher pressure than the critical lower threshold value.

The hydraulic actuators of the hydraulic system are driven by the fluid pressure in the accumulator, when the supply of pressurised fluid is decreased, e.g. the pump is deactivated/bypassed or the like.

The upper threshold value, which also constitutes the general upper pressure limit for the hydraulic system, varies with the type of system, its implementation and the actuations it performs. However, for a truck implementation a normal upper pressure is about 35 bar. However, alternative upper pressures can be e.g. 40 bar, 45 bar, 50 bar or 30 bar, 25 bar or 20 bar. The method is however not limited to the mentioned exemplary normal upper pressures, which are disclosed only as examples. The upper pressure limit is normally the designed working pressure of the pump.

To minimise the risk for reduced functionality from the hydraulic system when the pump delivers less hydraulic fluid into the hydraulic system, a limited actuation mode for the drive line is suggested. In the limited actuation mode the actuation frequency of the actuators of the driveline is reduced. The limited actuation mode is activated when the pressure in the hydraulic system, and thereby in the accumulator is at such a low level that there is a risk of reduced functionality of the hydraulic system. A reduced functionality would lead to that one or several of the hydraulic actuators could not be actuated, whereby in a worst case scenario, the vehicle would not be able to drive at all. However, by utilizing the limited actuation mode when the pressure in the hydraulic system is below a critical lower threshold value, the basic functionality of the hydraulic system is secured while the pump is increasing the system pressure. The main purpose of the limited actuation mode is to establish a fail-safe mode, such that the basic functions of the driveline always are present.

In one embodiment it is provided that the determining of the fluid pressure is performed continually, preferably continuously. It is further provided that the comparing is made continually in association with the determining of the fluid pressure. In an alternative approach, the determining of the fluid pressure and the associated comparing towards a threshold value is only performed if a pressure changing action has been performed, such as supplying fluid into the hydraulic system and/or actuating one of the actuators.

In one embodiment of the method the limited actuation mode at least comprises;
  down prioritizing gear shifts such that a current gear is used over a wider rpm interval than in the normal actuation mode.

By down prioritizing gear shifts and extend the use of a current gear over a longer rpm interval, than during normal gear shifting, fewer gear shift actuations need to be performed, whereby less pressurised fluid is consumed in the hydraulic system.

Further advantages and advantageous features of the method are disclosed in the following description and in the dependent claims.

In one implementation of the method the decreasing of supply of hydraulic fluid into the hydraulic system is performed by performing one of the steps of;
  controlling the pump to disengage,
  controlling the pump to decrease its displacement,
  controlling a bypass valve such that the hydraulic fluid bypasses the hydraulic system downstream of the pump.

All three steps achieves a decrease in supply of hydraulic system and thereby an energy saving for the vehicle. If the pump is disengaged it won't be pumping and thereby won't supply any hydraulic fluid into the hydraulic system. If the pump is controlled to decrease its displacement, less hydraulic fluid will be supplied into the hydraulic system. If a bypass valve is arranged downstream of the pump and upstream of the rest of the hydraulic system, there won't be any supply of hydraulic fluid into the hydraulic system. All three of these measures have an energy saving effect. In the following text all three alternatives will be referred to as low energy modes of the pump, which thereby is defined as any time when the pump does not supply its maximum amount of pressurised fluid into the hydraulic system.

In one embodiment of the method, when the transmission is controlled in a limited actuation mode, it further comprises the steps of;
  comparing the determined pressure of the hydraulic system with a lower threshold value and,
  if the determined pressure of the hydraulic system is above the lower threshold value,
    controlling the transmission in the normal actuation mode, wherein in the normal actuation mode the limited actuation mode is cancelled, i.e. the control mode of the transmission is switched from limited to normal actuation mode.

It is provided that the lower threshold value is higher than the critical lower threshold value and the upper threshold value is higher than the lower threshold value. The upper threshold value normally corresponds to the design pressure of the pump, i.e. the pressure the pump is designed to deliver, which normally is the maximum pressure the pump can deliver, whereby the pump supplies its maximum amount of hydraulic fluid into the hydraulic system. The lower threshold value is suggested to be set such that there is sufficient pressure to control the actuators of the drive line during all normal driving situations. With a normal driving situation is meant the driving situations that occurs about 90% of the driving time or preferably 95% or more preferably up to 99% of the driving time.

It is further suggested that the lower pressure limit and the critical lower pressure limit is at least about 75-60% of the upper pressure limit respectively, or preferably at least about 70-50% of the upper pressure limit respectively or at least about 60-40% of the upper pressure limit respectively.

The value of the lower threshold value varies with the type of system, its implementation and the actuations it performs. However, in an exemplary truck implementation, an exemplary upper pressure limit can be 35 bar, whereby a normal lower pressure is about 25 bar and a normal critical lower pressure limit is suggested to be about 20 bar, or about 20-15 bar respectively.

If it, at any time, is determined that the pressure of the hydraulic system is still below the critical lower threshold value, the transmission is controlled in the limited actuation mode.

A driving situation where a plurality of actuators are activated simultaneously and possibly repeatedly, such that the pump does not have the capacity to increase and/or maintain the pressure in the hydraulic system in the same rate as it is consumed, could result in a pressure drop below the lower threshold value. To ensure the functionality of the hydraulic system at all times, the lower threshold value could be set at a higher level to also cover such extreme driving conditions. However by introducing a lower threshold value, at which the oil supply into the hydraulic system is increased and a critical lower threshold value, at which the transmission is controlled in the limited actuation mode, the lower threshold value can be set to a lower value than if there was just a lower threshold value. This, since the when reaching the critical threshold value measures are taken to reduce the consumption of pressurised fluid and thereby giving an extra buffer for an unforeseen critical driving situation where a lot of pressurised fluid is consumed simultaneously.

A lower value of the lower threshold value increases the time period the pump can be in a low energy mode, which increases the energy efficiency of the driveline. The lower threshold value can be decreased due to the extra safety measures taken at the critical lower threshold value, i.e. controlling the transmission in a limited actuation mode, which ensures that sufficient pressure for basic actuator actuations are available until the pressure in the hydraulic system has been raised above the lower threshold value.

In one embodiment of the method the limited actuation mode further comprises one of;
  controlling the transmission to skip gears,
  controlling a clutch arranged between a propulsion unit and the transmission to a reduced actuation mode, where the actuation is simplified and any fine tuning of the clutch engagement is cancelled.

When the transmission skips gears it performs gearshift from e.g. second to fourth gear, or second to fifth gear or similar, instead of consecutive gear shifts, e.g. second to third gear, third to fourth gear, fourth to fifth gear, such gear skips reduces the number of actuator activations that consume hydraulic pressure. The same effect is achieved by controlling the clutch arranged between the propulsion unit and the transmission to perform the engagement and disengagement of the clutch, during gear shift, as swift as possible, instead of fine tuning in order to increase comfort, since the fine tuning of the clutch engagement is done by clutch actuators, which consumes hydraulic pressure.

In one embodiment the method further comprises the steps of;
  comparing the determined pressure of the hydraulic system with a lower threshold value and,
  if the pressure of the hydraulic system is below the lower threshold value, increasing the amount of hydraulic fluid that is supplied into the hydraulic system.

An effect of introducing the lower threshold value already when the supply of hydraulic fluid is reduced or turned off, is that the critical lower threshold value will not be reach very often, whereby the transmission can be controlled in the normal control mode as much as possible.

When the amount of hydraulic fluid that is supplied into the hydraulic system is increased, it has the effect that that the fluid pressure of the hydraulic system is increased to a higher pressure.

In one embodiment the method further comprises the steps of;
if detecting (108) an engine braking operation, or braking operation, then regulating (105) the fluid pressure (p) of the hydraulic system (10) to a higher pressure by increasing the amount of hydraulic fluid that is pumped into the hydraulic system (10). By using the kinetic energy during braking to drive the pump, the pressure can be raised in the hydraulic system from energy that does not affect the energy consumption of the vehicle.

In one embodiment the method further comprises;
predicting an imminent driving route,
determining the upper threshold value dependent on the imminent driving route.

The prediction of an imminent driving route can be made in any available way. For example, by GPS (or similar global navigation satellite system, GNSS) can the position of the vehicle be provided with a high accuracy. By positioning the vehicle location on a detailed map with road information, such as topography, curves of the road and traffic information, the imminent driving route and its effect on the vehicle can be estimated. The imminent driving route can be determined from e.g. a predetermined given route or a probability prediction based on historical vehicle, fleet or traffic information data. For the case of simplicity and explanation within this disclosure it is referred to a navigation device, wherein with a navigation device it is meant a device that has the capability to predict the imminent driving route, independently of the technology used for the prediction.

As a result, vehicles equipped with a navigation device can include algorithms to analyse road curvature and road slope and other relevant data collected by the navigation device, to generate a driveline control scheme for the imminent driving route. In this context the algorithm could predict a scarcity in hydraulic pressure during the imminent driving route, e.g. due to high demand of hydraulic actuation power, or alternatively an abundance of kinetic energy during the imminent driving route e.g. downhill driving and/or low hydraulic actuation. This could be used to set the threshold values dependent on the imminent driving route.

In one embodiment the method further comprises the steps of;
detecting a stretch of downhill driving in the imminent driving route, which stretch motivates a braking operation or an engine braking operation;
reducing the upper threshold value to a reduced upper threshold value.

By reducing the upper threshold value before reaching the stretch of downhill driving ensures that there are a need to supply the hydraulic system with hydraulic fluid and rise the pressure when the vehicle reaches the downhill stretch. The kinetic energy that otherwise would be wasted through a braking operation can be used to drive the pump and thereby supply hydraulic fluid into the hydraulic system. To realise this, the upper threshold value is raised to its original value, when the vehicle starts its braking operation, whereby this will ensure that it will be possible to supply hydraulic fluid into the hydraulic system with energy from the braking or engine braking operation.

The inclination that motivates a braking operation is dependent on vehicle parameters such as rolling resistance and vehicle load. But normally for a truck an inclination from −1% would motivate a braking operation and preferably an engine braking or retarder braking operation. Hence, possible inclination threshold values could be −1%, −2%, −3%, −5% or −8% inclination.

In one embodiment the method further comprises the steps of;
predicting an imminent driving route,
determining the lower threshold value dependent on the imminent driving route.

In one embodiment the method further comprises the steps of;
detecting a stretch of downhill driving in the imminent driving route, which stretch motivates to turn off a propulsion unit,
increasing the lower threshold value to an increased lower threshold value.

Driving a vehicle with a turned off propulsion unit is also referred to as sailing. By increasing the lower threshold value to an increased lower threshold value, the hydraulic system will be set to be supplied with hydraulic fluid sooner than with the original lower threshold value. It is suggested that the lower threshold value is set to be equal or essentially equal to the upper threshold value, whereby the hydraulic system will be supplied with hydraulic fluid constantly to ensure that the accumulator is full when reaching the stretch of downhill driving that motivates a turn off the propulsion unit. This ensures that the propulsion unit can be turned off as long as possible when the conditions for a sailing of the vehicle remains.

In one exemplary embodiment of the method, the lower threshold value is set to be equal to the upper threshold value when a stretch of downhill driving, which motivates to turn off the propulsion unit, is detected in the imminent driving route.

The inclination that motivates a sailing operation, i.e. turning off of the propulsion unit is dependent on vehicle parameters such as rolling resistance, vehicle load and vehicle speed. But normally for a truck implementation an inclination from −0.5% to −2% during about 4 to 6 seconds would motivate a turning off of the propulsion unit, if the downhill slope is predicted to last a sufficient time period.

One aspect of this disclosure concerns a computer program product comprising program code means for performing the steps of any of the aspects of the method described herein, when the program is run on a computer.

One aspect of this disclosure concerns a computer readable medium carrying a computer program comprising program code means for controlling a drive line control device to perform the steps of any of the aspects of the method described herein, when the program product is run on a computer.

One aspect of this disclosure concerns a control unit for controlling a hydraulic system of a vehicle, the control unit being configured to perform the steps of any of the aspects of the method described herein.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
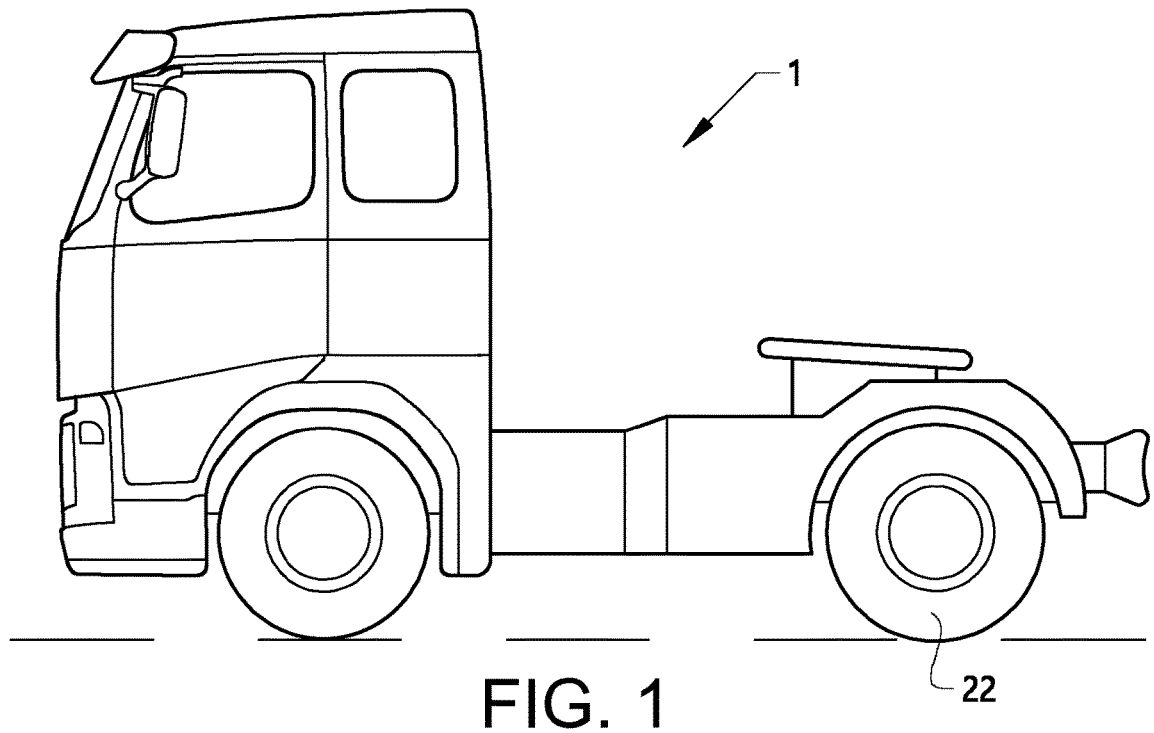
FIG. 1 is a side view of a truck suitable for implementation of the method of claim 1 disclosed.

The present invention will now be described more fully hereinafter with reference to the accompanying drawings, in which exemplary embodiments of the method are shown. The method may however be embodied in many different forms and should not be construed as limited to the embodiments set forth herein; rather, these embodiments are provided for thoroughness and completeness, and full convey the scope of the invention to the skilled addressee. Like reference characters refer to the like elements throughout the description.

FIG. 1 schematically illustrates a truck 1 with a driveline, on which the method of claim 1 can be applied.

Figure 2:
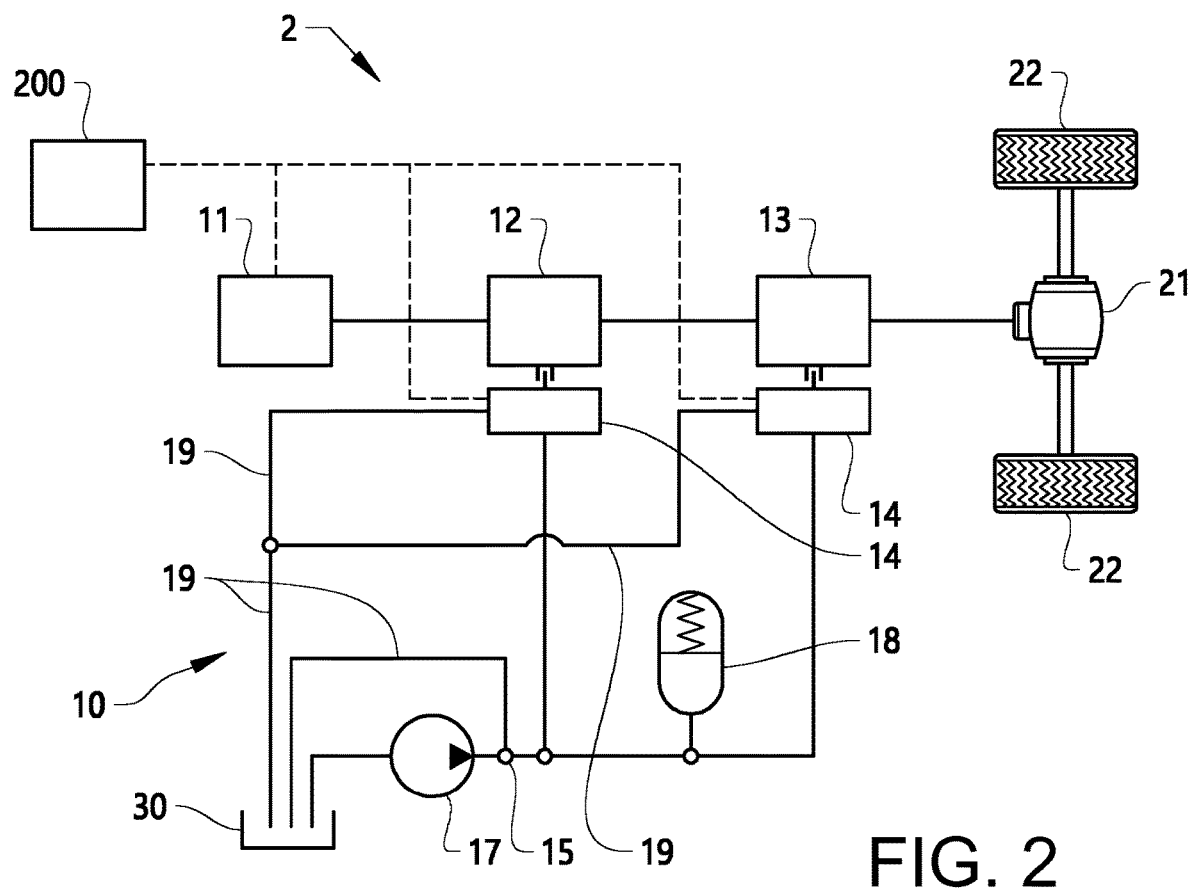
FIG. 2 is a schematic drawing of a driveline suitable for implementation of the method of claim 1 disclosed.

FIG. 2 schematically illustrates a driveline 2 of the truck 1. The driveline 2 is provided with a hydraulic system 10, which is a pressurised hydraulic system to actuate actuators 14 of the driveline 2. The actuators 14 controls different function of the driveline 2, such as engagement, disengagement and fine tuning of the clutch and shift actuations 14. In FIG. 2 is only two symbolic actuators 14 disclosed, it should be understood that the method can be applied on one or a plurality of actuators in the driveline 2.

The driveline 2 comprises at least a propulsion unit 11, a clutch 12 and a transmission 13, where the clutch 12 is arranged in-between the transmission 13 and the propulsion unit 11 in order to engage and disengage the propulsion unit 11 to/from the transmission 13. In the drawing is further a differential gear 21 and the drive wheels 22 disclosed. The propulsion unit is preferably a combustion engine.

A control unit 200 is provided to perform the method controlling the driveline 2, wherein the control unit 200 thereby assigns local controls of the actuators to control the actuators according to the method.

Only one exemplary control unit 200 is disclosed in FIG. 2, the control unit 200 can be a central control unit 200 or a distributed control unit 200, which utilises a plurality of distributed control units 200 to perform the tasks of the control unit 200.

The hydraulic system 10 is at least provided with a pump 17, a reservoir 30, an accumulator 18, actuators 14 and hydraulic conduits 19 enabling a fluid connecting between the different parts of the hydraulic system 10. The pump 17 is adapted to pump hydraulic fluid into the pressurised part of the hydraulic system 10 from the hydraulic fluid reservoir 30. However, this is referred to as supplying hydraulic fluid into the hydraulic system 10. Due to the accumulator 18, the actuators can be controlled even though the pump is delivering less hydraulic fluid into the hydraulic system 10, i.e. the pump 17 is set into a low energy mode. The pressurised part of the hydraulic system 10 comprises all parts downstream of the pump 17 and where the actuators 14 are the end users. The exemplary hydraulic system 10 in FIG. 2 also comprises a bypass valve 15 arranged directly downstream of the pump 17, such that when activated, it bypasses the hydraulic system 10 downstream of the bypass valve 15.

The pump 17 can e.g. be propelled through a mechanical connection to e.g. the propulsion unit 11, the clutch 12 or the transmission 13 or be an electrically driven pump 17.

The pump 17 can be driven in at least a high energy mode and a low energy mode. In the high energy mode the pump 17 delivers hydraulic fluid into the hydraulic system 10. In the low energy mode the pump 17 is turned off or delivers substantially less hydraulic fluid into the hydraulic system 10.

Figure 3:
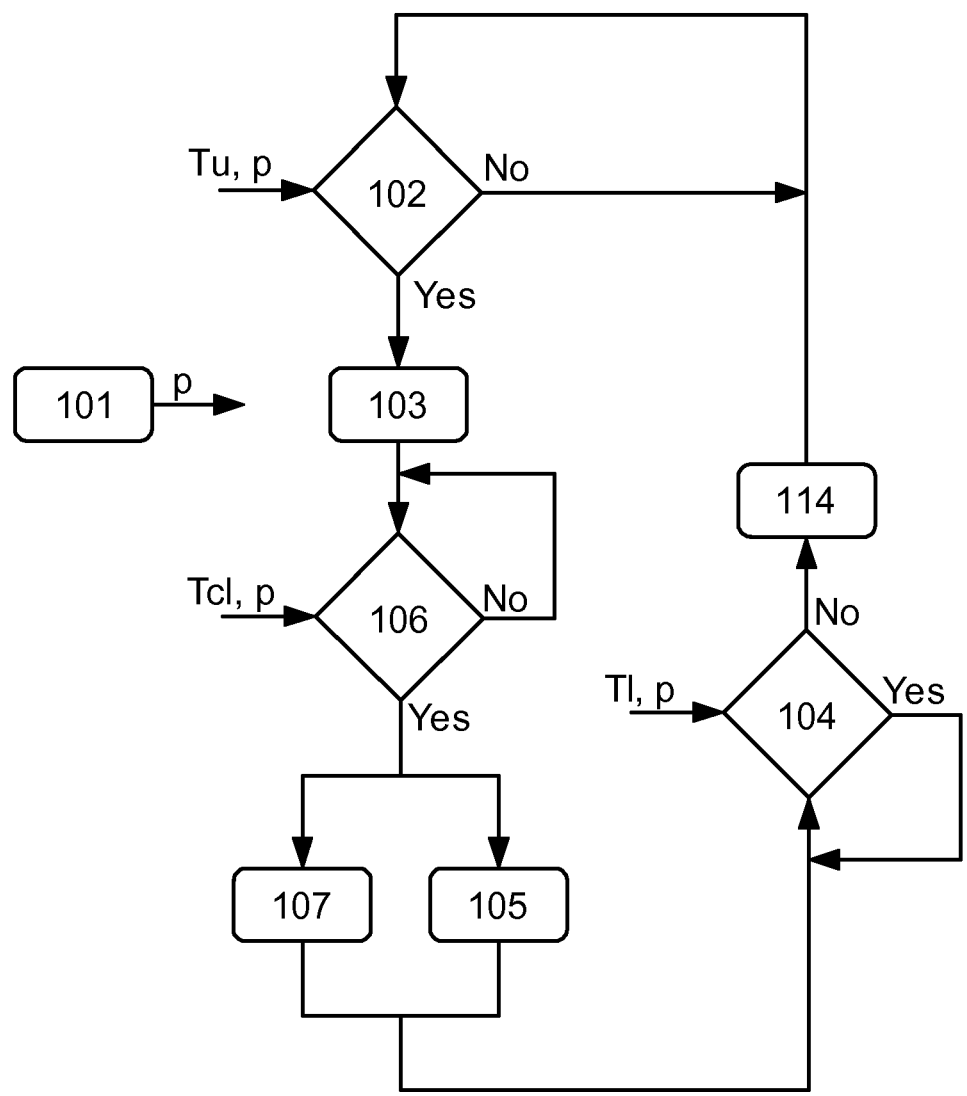
FIG. 3 is a flowchart of an embodiment of the method to control a hydraulic system of a vehicle driveline disclosed.

FIG. 3 discloses a first embodiment of the method. The method is performed continuously by the control unit 200 of the driveline 2.

It is suggested that when the method starts, the pump 17 is always in its high energy mode, i.e. supplying hydraulic fluid into the hydraulic system 10.

In method step 101 the fluid pressure p in the hydraulic system 10 is continually determined. This can be done by a pressure sensor in the pressurised part of the hydraulic system 10 or deriving the pressure from another measurable parameter of the hydraulic system 10. Normally the fluid pressure p is determined continuously, and in the method the latest determined fluid pressure is used as input in the different steps of the method.

The fluid pressure p of the hydraulic system 10 is compared 102 with an upper threshold value Tu. Where Tu normally essentially corresponds to an upper working pressure of the pump 17. If the determined fluid pressure p is equal to or above the upper threshold value Tu the supply of hydraulic fluid into the hydraulic system 10 is decreased, i.e. the pump 17 is set in a low energy mode.

A low energy mode of the pump 17 can be any of;
  controlling the pump 17 to disengage from its drive source,
  controlling the pump 17 to decrease its displacement,
  controlling the pump 17 to lower its working pressure,
  controlling the pump 17 to lower its working speed, and/or
  controlling the bypass valve 15 such that the hydraulic fluid bypasses the hydraulic system 10 downstream of the pump 17.

If the determined fluid pressure p is below the upper threshold value Tu, no measures are taken dependent thereon, instead is the comparison 102 of the determined pressure p with the upper threshold value Tu performed again.

When the pump 17 is in its low energy mode the fluid pressure p of the hydraulic system 10 is compared 106 with a lower critical threshold value Tcl. If the determined fluid pressure p is equal to or below the lower critical threshold value Tcl it triggers two actions. The pump 17 is set 105 in its high energy mode, i.e. it is controlled to increase its supply of hydraulic fluid into the hydraulic system 10 and the driveline 2 is controlled 107 in a limited actuation mode.

By setting the pump 17 in its high energy mode it starts to build up the pressure of the hydraulic system 10 again.

In order to avoid an overload of the hydraulic system, the driveline 2 is simultaneously controlled in a limited actuation mode.

In the limited actuation mode the transmission 13 is controlled such that less actuator actuations are performed in comparison to a normal actuation mode. One way to achieve this is down prioritizing gear shifts such that a current gear is used over a longer rpm interval than in a normal actuation mode. Another way to achieve the limited actuation mode is to control the clutch 12 such that it performs its actuations as energy effective as possible, i.e. the clutch engagement and disengagement is not fine-tuned. Another way to achieve the limited actuation mode is to skip gears in the gear shifting sequence. Another way to achieve the limited actuation mode, in the case where the clutch is a double clutch connected to a double clutch transmission is to just perform power brake shifts and no power shifts, which needs more fine-tuning in the engagement/disengagement of the clutch.

If it, in the comparison 106 of the fluid pressure p in the hydraulic system 10 with the critical threshold value Tcl, is determined that the fluid pressure p is above the critical lower threshold value, this triggers that the comparison 106 is performed again.

When the driveline 2 is controlled in the limited actuation mode and the pump 17 has been switched to its high energy mode, the fluid pressure p is compared 104 with a lower threshold value Tl.

If it is determined in 104 that the fluid pressure p is below the lower threshold value Tl, the driveline control is kept in the limited actuation mode and if it is determined 104 that the fluid pressure p is above the lower threshold value Tl, the driveline 2 is controlled 114 in its normal actuation mode, i.e. the limited actuation mode is cancelled. The pump will however be kept in its high energy mode independently of the outcome of this comparison.

By switching off the limited actuation mode as soon as a lower threshold value has been reached, the time period the vehicle is driven in the limited actuation mode is kept at a minimum. This is beneficial since in the limited actuation mode the limitation of actuator actuations is prioritised before vehicle performance and comfort.

The lower threshold value Tl is higher than the critical lower threshold value Tcl. The lower threshold value is selected such that the pressure in the hydraulic system is sufficient to actuate the actuators 14 in the driveline 2 during normal driving conditions. With a normal driving situation is meant the driving situations that occurs about 90% of the driving time or preferably 95% or more preferably up to 99% of the driving time.

The method ensures that the pump 17 can be driven in a low energy mode as long as possible and still maintaining performance of the driveline 2 as much as possible. To ensure this the driveline 2 is controlled in a limited actuation mode when the pressure p in the hydraulic system 10 decreases below the critical lower threshold value Tl. In the limited actuation mode, the performance of the driveline is obviously somewhat limited due to the restrictions in the limited actuation mode. However, since the pump 17 is controlled to be driven in its high energy mode as soon as the driveline 2 is set in its limited actuation mode, in most cases the pressure p in the hydraulic system 10 is raised above the lower threshold value quickly, whereby only a small number of actuations has to be performed in the limited actuation mode.

In one exemplary implementation of the method, the fluid pressure in the hydraulic system 10 is always and continually compared 106 to the lower critical threshold value, in order to always be able to activate the limited actuation mode if a critical driving situation consuming a lot of hydraulic fluid occurs, which results in a sudden decrease of the fluid pressure. I.e. the limited actuation mode can be activated even if the pump 17 has been controlled to increase the fluid pressure in the hydraulic system 10. This implementation is possible to combine with any implementation of the method providing a limited actuation mode.

Figure 4:
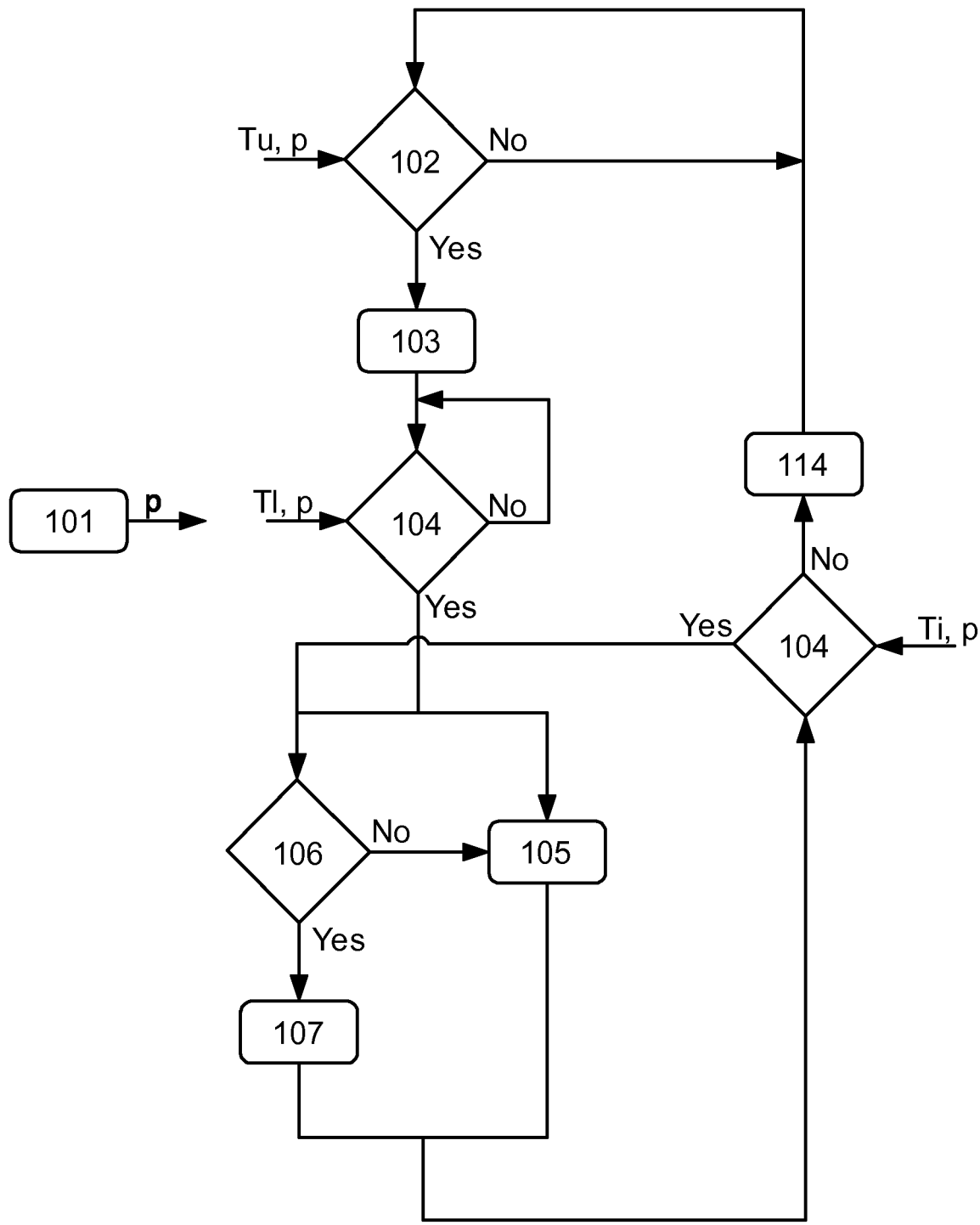
FIG. 4 is a flowchart of an embodiment of the method to control a hydraulic system of a vehicle driveline disclosed.

FIG. 4 discloses a flowchart of an alternative implementation of the method. The method starts identically to the method discussed in conjunction with FIG. 3. However, before comparing in step 106 the pressure p with the critical lower threshold value Tcl, a comparison 104 with the lower threshold value Tl is done.

If it is determined in step 104 that the fluid pressure p is below the lower threshold value Tl, the pump 17 is controlled in its high energy mode and the comparison in step 106 of the fluid pressure p with a lower critical threshold value Tcl is performed. If the determined fluid pressure p is above the lower critical threshold value Tcl, the pump is in step 105 kept in its high energy mode and next step would be to compare 104 the pressure p with the lower threshold value Tl.

However if, the pressure is equal to or below the lower critical threshold value Tcl the driveline 2 is controlled in step 107 in a limited actuation mode. In difference to the implementation of the method disclosed in FIG. 3, the pump 17 is already set in step 105 in its high energy mode, directly after the pressure had fallen below the lower threshold value Tl.

To ensure that the pressure p is built up at least above the lower threshold value Tl, a comparison in step 104 of the pressure p with the lower threshold value Tl, whereby if the pressure p is below the lower threshold value Tl, the method step 106 is repeated and if the pressure p is above the lower threshold value Tl, the driveline 2 is controlled in step 114 in its normal mode, i.e. the limited actuation mode is cancelled in those cases where the drive line has been controlled in the limited actuation mode.

In the implementation of the method shown as a flowchart in FIG. 4 the lower threshold value is introduced already directly after the pump 17 has been set in step 103 in its low energy mode, and thereafter is the pressure p of the hydraulic system monitored, and if it falls below the critical lower threshold value Tcl the driveline 2 is controlled in its limited actuation mode. The effect of having a lower threshold value Tl and a critical lower threshold value Tcl is that the lower threshold value Tl can be set to a lower value than if there was no critical lower threshold value Tcl at which the limited actuation mode is introduced.

Hence the introduction of the limited actuation mode at a pressure below the lower threshold value ensures that there is sufficient pressure in the hydraulic system to control the driveline 2, even though there is a sudden high demand of hydraulic pressure simultaneously as the pump 17 has been re-started and not been able to build up the pressure in the hydraulic system 10.

Figure 5:
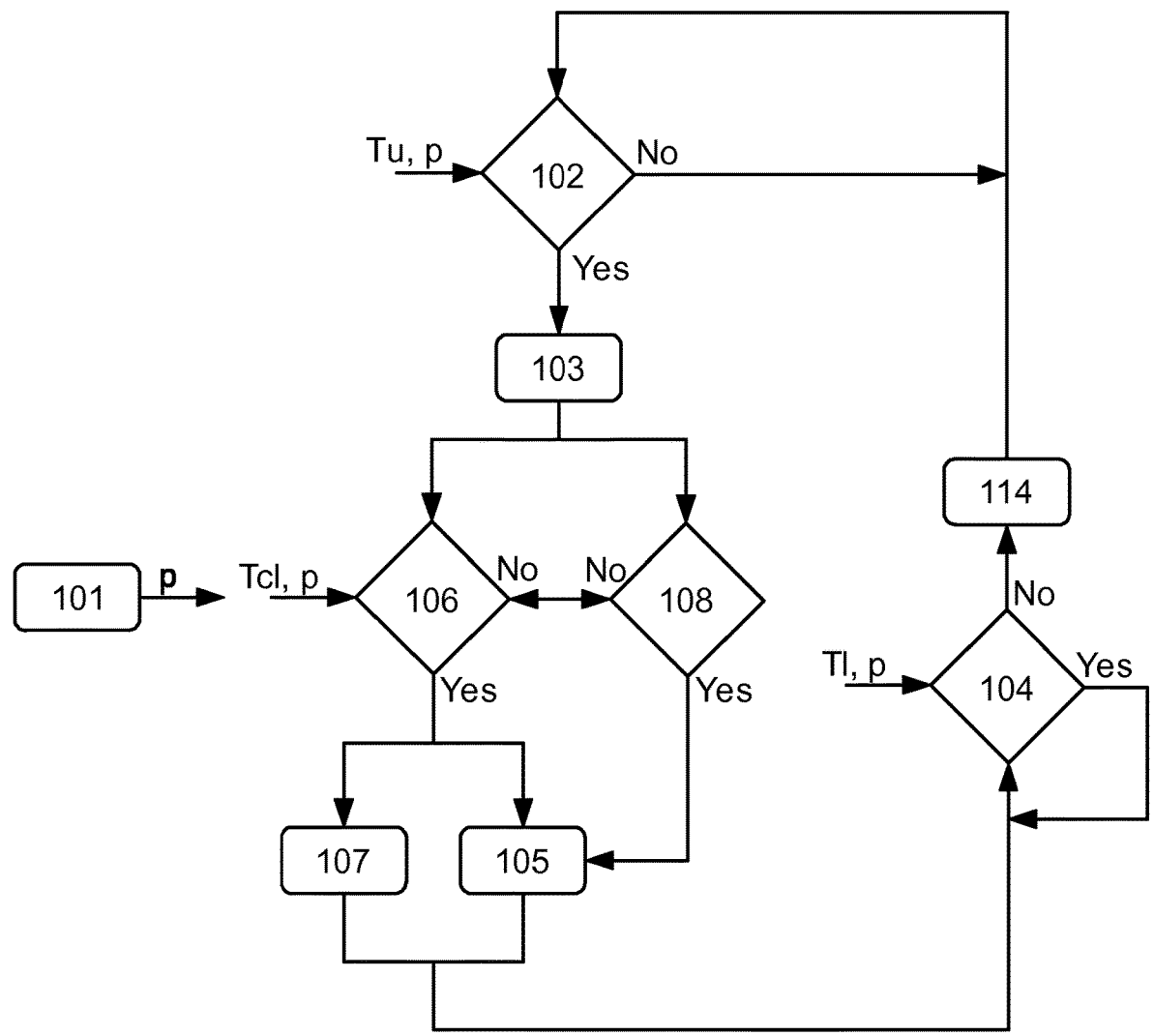
FIG. 5 is a flowchart of an embodiment of the method to control a hydraulic system of a vehicle driveline disclosed.

In FIG. 5 a flowchart of an alternative implementation of the method is disclosed. This implementation differs from the implementation described together with FIG. 3 above in that a method step 108 parallel to the comparison of the pressure p with the critical lower threshold value Tcl is introduced, in which an engine brake operation is detected in step 108, whereby if an engine braking operation is detected (yes in step 108) the pump 17 is controlled in step 105 into its high energy mode.

The implementation disclosed by the flowchart in FIG. 5 can also be combined with the implementation disclosed by the flowchart in FIG. 4, whereby the pump would be put in its high energy mode anytime when an engine braking operation is detected.

Figure 6:
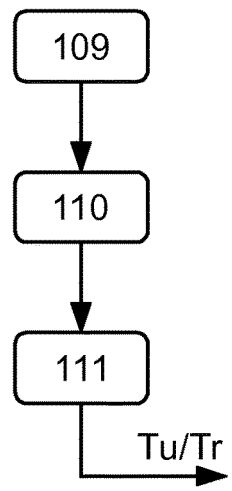
FIG. 6 is a flowchart of an embodiment of the method to control a hydraulic system of a vehicle driveline disclosed.

In FIG. 6 a flowchart for an implementation with a variable upper threshold value Tu is disclosed. The upper threshold value Tu is used to determine when the pump 17 should be controlled in method step 102 into its low energy mode.

First an imminent driving route is detected 109, whereby an upper threshold value Tu is determined based on the imminent driving route in method step 110. If the imminent driving route comprises a stretch of downhill driving that motivates an engine braking operation over a sufficient time, the upper threshold Tu is reduced to a reduced upper threshold Tr in method step 111. When the vehicle reaches the downhill stretch and starts the engine braking operation, the upper threshold value is set to its original value again. Due to that the reduced upper threshold value Tr is used before reaching the downhill stretch, it is ensured that there is room for increasing the pressure p in the hydraulic system 10, i.e. the pressure accumulator 18. When the vehicle reaches the downhill stretch and starts its engine braking operation, the pressure p in the hydraulic system 10 is increased by driving the pump 17 from the kinetic energy that otherwise would have been lostthrough the engine braking operation. In one exemplary embodiment the pump 17 is driven via a mechanical connection by the drive line. The method is however applicable also to alternative propulsions of the pump such as an electrical propulsion. The propulsion of the pump 17 as such is however known and not part of this invention.

Figure 7:
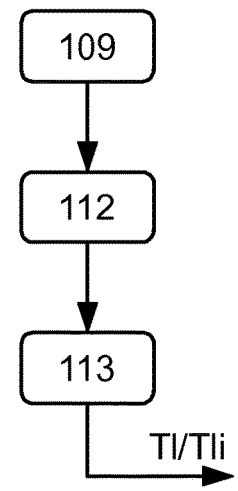
FIG. 7 is a flowchart of an embodiment of the method to control a hydraulic system of a vehicle driveline disclosed.

In FIG. 7 a flowchart for an implementation with a variable lower threshold value Tli is disclosed. The lower threshold value Tl is used to determine when the pump 17 should be controlled in step 105 into its high energy mode.

First an imminent driving route is detected 109, whereby a lower threshold value Tl is determined based on the imminent driving route in method step 112. If the imminent driving route comprises a stretch of downhill driving that motivates a turning off of the propulsion unit 11, the lower threshold value Tl is increased to an increased lower threshold value in method step 113. The increased lower threshold value is preferably essentially equal to the upper threshold value Tu. By increasing the lower threshold value Tl, the pump 17 will be driven in its high energy mode more often and if the increased lower threshold value Tli is equal to the upper threshold value Tu, the pump 17 will ensure that the hydraulic system 10 always has its highest possible pressure. Now when the propulsion unit 11 is turned off in the downhill stretch, the lower threshold value Tl is set back to its original value. The increased lower threshold value Tli ensures that when the vehicle reaches the downhill stretch and turns off the propulsion unit (starts sailing), there is a possibility to have the pump 17 turned off as long as possible. It is to be understood that the increased lower threshold value Tli can be a unique sailing threshold value that is independent of the lower threshold value Tl, just that the increased lower threshold value Tli is used in preparation for a sailing operation.

Figure 8:
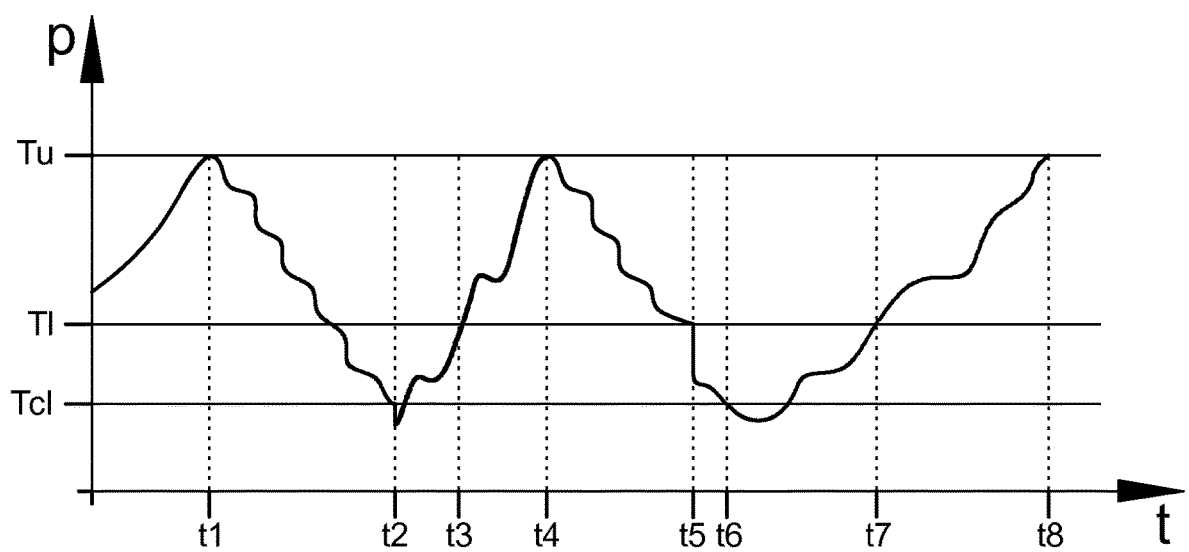
FIG. 8 is an exemplary diagram of how the pressure in the hydraulic system varies dependent on the number of actuations of the actuators and increasing/decreasing the supply of hydraulic fluid into the hydraulic system.

FIG. 8 discloses a schematic a simplified diagram of how the pressure p in the hydraulic system 10 varies over time t. Time t=0 is typically at start of the propulsion unit 11 of the driveline 2. Simultaneously is the pump 17 set into its high energy mode, such that the pressure in the hydraulic system 10 is increased to its upper threshold value Tu, i.e comparison (method step 102=Yes), at t=t1, where the pump 17 is controlled 103 to its low energy mode.

From t=t1 to t=t2 the method continuously determines that the pressure p is above the critical lower threshold value Tcl. The pressure p is however decreasing with increased number of actuations of the actuators 14 of the driveline 2. In the diagram the actuations of the actuators are symbolically disclosed as pressure falls. At t=t2 it is determined (method step 106=Yes) that the pressure p is equal or lower than the critical lower threshold value Tcl, whereby the pump 17 is controlled (method step 105) in its high energy mode and the driveline 2 is controlled in a limited actuation mode.

Now between t=t2 and t=t4 the pump 17 increases the pressure p in the hydraulic system 10 up to the upper threshold value Tu. Depending on how the actuators 14 is/are actuated during this time period, the building up of pressure p goes faster or slower. Actuator actuation during the pressure build up are symbolically disclosed as indentions in the pressure curve.

At t=t3 the pressure p has been raised above the lower threshold value Tl (method step 104=Yes), whereby the driveline 2 is controlled (method step 114) in its normal mode.

At t=t4 the pressure p has again increased to its upper threshold value Tu, i.e. comparison 102=Yes, and the pump 17 is controlled 103 to its low energy mode.

Now from t=t4 to t=t8 the method as disclosed by the flowchart in FIG. 4 will be described.

From t=t4 to t=t5 the method continuously determines that the pressure p is above the lower threshold value Tcl. The pressure p is however decreasing due to actuations of the actuators 14 of the driveline 2. The actuations of the actuators are symbolically disclosed as pressure falls. At t=t5 it is determined that the pressure p is equal or lower than the lower threshold value Tl, whereby the pump 17 is controlled (method step 105) in its high energy mode. As can be seen in the diagram there is a lot of actuator actuations at t=t5, whereby the pressure p is falling steep. The pump 17 is set in its high energy mode (method step 105) and the pressure p is compared to the lower threshold value Tl (method step 104) and the critical lower threshold value Tcl (method step 106). At t=t6 the pressure p has fallen to be equal to or below the critical lower threshold value (method step 106=Yes), whereby the driveline 2 is controlled in a limited actuation mode, in order to reduce the consumption of pressurised fluid. At t=t7 the pressure has again risen above the lower threshold value Tl (method step 104=Yes), whereby the driveline 2 is controlled (method step 114) in its normal mode (the limited actuation mode is cancelled).

Between t=t7 and t=t8 the pump 17 increases the pressure p in the hydraulic system 10 up to the upper threshold value Tu. Depending on how the actuators 14 is/are actuated during this time period, the building up of pressure p goes faster or slower. Actuator actuation during the pressure build up are symbolically disclosed as indentions in the pressure curve.

The use of a reduced upper threshold value Tr and increased lower threshold values Tli can be used in any of the disclosed implementations of the method, where these threshold values are used.

It is to be understood that the present invention is not limited to the embodiments described above and illustrated in the drawings; rather, the skilled person will recognize that many changes and modifications may be made within the scope of the appended claims.

The invention claimed is:

1. A method for controlling a hydraulic system of a vehicle driveline, wherein the hydraulic system at least comprises a pump, a pressure accumulator, and a hydraulic actuator arranged in fluid connection with each other, for controlling functions of the driveline, wherein the pump is arranged to supply hydraulic fluid into the hydraulic system, characterised by the steps of; determining a fluid pressure in the hydraulic system, comparing the determined fluid pressure with an upper threshold value and, when the determined fluid pressure is above the upper threshold value decreasing the supply of hydraulic fluid into the hydraulic system, comparing the fluid pressure of the hydraulic system with a critical lower threshold value and, when the pressure is below the critical lower threshold value, controlling a transmission of the driveline in a limited actuation mode, and wherein in the limited actuation mode the transmission is controlled such that less actuations of the actuator is performed in comparison to a normal actuation mode.

2. Method according to claim 1, wherein when the pressure is below the predetermined critical lower threshold value, the method further comprises the step of; increasing the supply of hydraulic fluid into the hydraulic system.

3. Method according to claim 1, wherein the limited actuation mode at least comprises; down prioritizing gear shifts such that a current gear is used over a wider rpm interval than in the normal actuation mode.

4. Method according to claim 1, wherein the method step of decreasing the supply of hydraulic fluid into the hydraulic system is performed by performing one of the steps of; controlling the pump to disengage, controlling the pump to decrease its displacement, controlling a bypass valve such that the hydraulic fluid bypasses the hydraulic system downstream of the pump.

5. Method according to claim 1, wherein the method further comprises the steps of; comparing the determined pressure of the hydraulic system with a lower threshold value and, when the determined pressure is below the lower threshold value, controlling the transmission in a normal actuation mode, where in the normal actuation mode, the limited actuation mode is cancelled.

6. Method according to claim 1, wherein the limited actuation mode further comprises one of; controlling the transmission to skip gears, controlling a clutch arranged between a propulsion unit and the transmission to a restricted actuation mode, in which any fine tuning of a clutch engagement is cancelled.

7. Method according to claim 1, wherein the method further comprises the steps of; comparing the determined pressure of the hydraulic system with a lower threshold value and, when the pressure of the hydraulic system is below the lower threshold value, regulating the fluid pressure of the hydraulic system to a higher pressure by increasing the amount of hydraulic fluid that is pumped into the hydraulic system.

8. Method according to claim 1, wherein the method further comprises the steps of; when detecting an engine braking operation, or braking operation, then regulating the fluid pressure of the hydraulic system to a higher pressure by increasing the amount of hydraulic fluid that is pumped into the hydraulic system.

9. Method according to claim 1, wherein the method further comprises; predicting an imminent driving route, determining the upper threshold value dependent on the imminent driving route.

10. Method according to claim 9, wherein the method further comprises the steps of; detecting a stretch of downhill driving in the imminent driving route, which stretch motivates an engine braking operation; reducing the upper threshold value to a reduced upper threshold value.

11. Method according to claim 5, wherein the method further comprises the steps of; predicting an imminent driving route, determining the lower threshold value dependent on the imminent driving route.

12. Method according to claim 11, wherein the method further comprises the steps of; detecting a stretch of downhill driving in the imminent driving route, which stretch motivates to turn off a propulsion unit, increasing the lower threshold value to an increased lower threshold value.

13. Computer program product comprising program code for performing the method steps of claim 1, when the program is run on a computer.

14. A non-transitory computer readable medium carrying a computer program comprising program code for controlling a drive line control device to perform the steps of claim 1, when the program product is run on a computer.

15. A control unit for controlling a hydraulic system of a vehicle, the control unit being configured to perform the steps of the method according to claim 1.

* * * * *